United States Patent
Ide

(10) Patent No.: US 10,563,983 B2
(45) Date of Patent: Feb. 18, 2020

(54) PHYSICAL QUANTITY SENSOR, ELECTRONIC APPARATUS, AND MOVING OBJECT

(71) Applicant: Seiko Epson Corporation, Tokyo (JP)

(72) Inventor: Tsugio Ide, Minowa (JP)

(73) Assignee: Seiko Epson Corporation (JP)

( * ) Notice: Subject to any disclaimer, the term of this patent is extended or adjusted under 35 U.S.C. 154(b) by 134 days.

(21) Appl. No.: 15/086,231

(22) Filed: Mar. 31, 2016

(65) Prior Publication Data

US 2016/0298964 A1    Oct. 13, 2016

(30) Foreign Application Priority Data

Apr. 13, 2015  (JP) ................................ 2015-081499

(51) Int. Cl.
    *G01C 19/5783*    (2012.01)
    *G01C 19/5642*    (2012.01)

(52) U.S. Cl.
    CPC ..... *G01C 19/5642* (2013.01); *G01C 19/5783* (2013.01)

(58) Field of Classification Search
    CPC .............................................. G01C 19/5783
    USPC .......................................................... 73/510
    See application file for complete search history.

(56) References Cited

U.S. PATENT DOCUMENTS

| | | | |
|---|---|---|---|
| 7,167,785 | B2 | 1/2007 | Lohberg et al. |
| 9,151,776 | B2 | 10/2015 | Jeong et al. |
| 9,557,345 | B2 | 1/2017 | Maeda et al. |
| 2003/0055550 | A1 | 3/2003 | Lohberg et al. |
| 2004/0200279 | A1* | 10/2004 | Mitani ............... G01C 19/5663 73/504.03 |
| 2010/0072862 | A1* | 3/2010 | Berger .................. B81B 7/0058 310/370 |
| 2010/0206075 | A1 | 8/2010 | Oshio |
| 2011/0036167 | A1 | 2/2011 | Ohkoshi et al. |
| 2013/0081462 | A1 | 4/2013 | Oshio |
| 2013/0312517 | A1 | 11/2013 | Jeong et al. |
| 2013/0340524 | A1 | 12/2013 | Maeda et al. |
| 2016/0195567 | A1* | 7/2016 | Tanaka .................. G01P 15/125 73/514.32 |

FOREIGN PATENT DOCUMENTS

| | | |
|---|---|---|
| CN | 101806812 A | 8/2010 |
| JP | 10-239064 A | 9/1998 |
| JP | 2003-525814 A | 9/2003 |
| JP | 2008-076264 A | 4/2008 |
| JP | 2009-080107 A | 4/2009 |
| JP | 2012-168097 A | 9/2012 |
| JP | 2014-006182 A | 1/2014 |

* cited by examiner

*Primary Examiner* — John E Chapman, Jr.
(74) *Attorney, Agent, or Firm* — Harness, Dickey & Pierce, P.L.C.

(57) ABSTRACT

A physical quantity sensor includes: an angular velocity detection element; an acceleration detection element; a bonding wire through which a detection signal of the acceleration detection element propagates; and a shield unit that is located between the angular velocity detection element and the bonding wire and is connected to a fixed potential. The angular velocity detection element and the acceleration detection element are disposed to be deviated in a height direction. At least a part of the shield unit is disposed between the angular velocity detection element and the acceleration detection element.

19 Claims, 17 Drawing Sheets

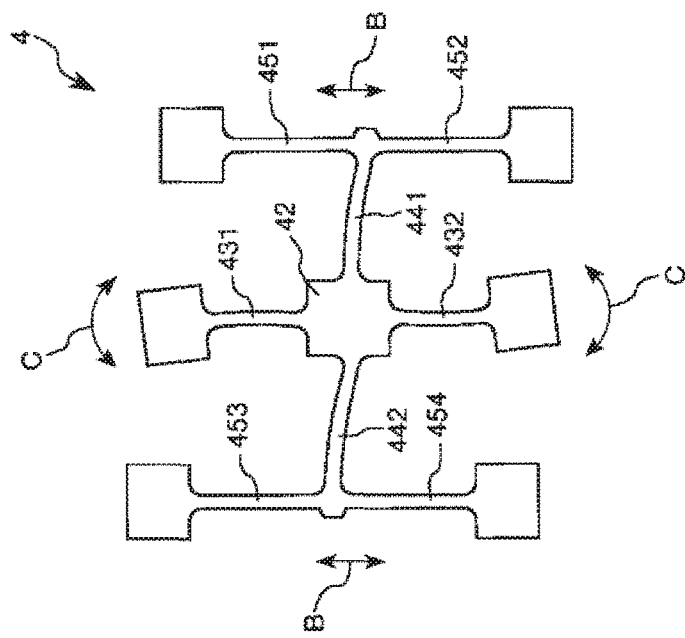
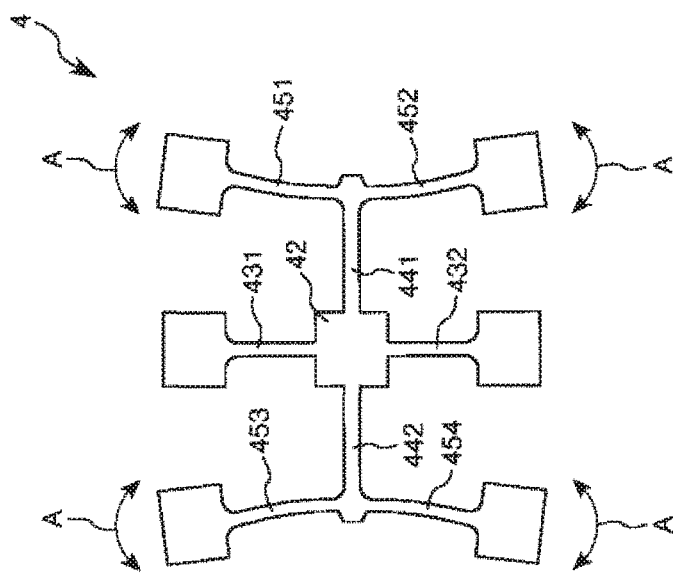
FIG. 6A
FIG. 6B

PHYSICAL QUANTITY SENSOR, ELECTRONIC APPARATUS, AND MOVING OBJECT

BACKGROUND

1. Technical Field

The present invention relates to a physical quantity sensor, an electronic apparatus, and a moving object.

2. Related Art

For example, JP-A-2008-76264 discloses a composite sensor in which an IC chip, an angular velocity detection element, and an acceleration detection element are accommodated in layers in a package. However, in such a configuration, a drive signal of the angular velocity detection element is mixed as noise in a detected signal of the acceleration detection element or a digital signal input to or output from the IC chip is mixed as noise in a detection signal of the acceleration detection element, and thus there is a problem that detection accuracy deteriorates.

SUMMARY

An advantage of some aspects of the invention is that it provides a physical quantity sensor, an electronic apparatus, and a moving object capable of reducing occurrence of noise and realizing good detection accuracy.

The invention can be implemented as the following forms or application examples.

APPLICATION EXAMPLE 1

A physical quantity sensor according to this application example includes: an angular velocity detection element; an acceleration detection element; an acceleration detection signal wiring through which a detection signal of the acceleration detection element propagates; and a shield unit that is located between the angular velocity detection element and the acceleration detection signal wiring and is connected to a fixed potential.

With this configuration, it is possible to obtain the physical quantity sensor capable of reducing occurrence of noise and realizing good detection accuracy.

APPLICATION EXAMPLE 2

In the physical quantity sensor according to the application example, it is preferable that the angular velocity detection element and the acceleration detection element are disposed to be deviated in a height direction, and at least a part of the shield unit is disposed between the angular velocity detection element and the acceleration detection element.

With this configuration, it is possible to further reduce occurrence of noise.

APPLICATION EXAMPLE 3

In the physical quantity sensor according to the application example, it is preferable that the angular velocity detection element and the acceleration detection element are disposed to be deviated in a direction perpendicular to a height direction, and at least a part of the shield unit is disposed between the angular velocity detection element and the acceleration detection element.

With this configuration, it is possible to further reduce occurrence of noise.

APPLICATION EXAMPLE 4

In the physical quantity sensor according to the application example, it is preferable that at least a part of the shield unit is disposed between an acceleration detection signal wiring connected to the acceleration detection element and at least one of a drive signal wiring through which a drive signal of the angular velocity detection element propagates and an angular velocity detection signal wiring through which the detection signal propagates.

With this configuration, it is possible to further reduce occurrence of noise.

Application Example 5

In the physical quantity sensor according to the application example, it is preferable that at least the part of the shield unit is disposed between a carrier wave wiring through which a carrier wave to be applied to the acceleration detection element propagates and at least one of the drive signal wiring and the angular velocity detection signal wiring.

With this configuration, it is possible to further reduce occurrence of noise.

APPLICATION EXAMPLE 6

It is preferable that the physical quantity sensor according to the application example further includes a circuit that is electrically connected to the angular velocity detection element and the acceleration detection element; and a digital wiring that is connected to the circuit and through which a digital signal propagates, and at least a part of the shield unit is disposed between the digital wiring and the angular velocity detection element.

With this configuration, it is possible to further reduce occurrence of noise.

APPLICATION EXAMPLE 7

In the physical quantity sensor according to the application example, it is preferable that, in a plan view, the acceleration detection signal wiring is disposed on one side of a center of the circuit and the digital wiring is disposed on the other side of the center.

With this configuration, it is possible to further reduce occurrence of noise.

APPLICATION EXAMPLE 8

It is preferable that the physical quantity sensor according to the application example further includes a support substrate that supports the angular velocity detection element, and the shield unit is disposed in the support substrate.

With this configuration, the configuration of the device is further simplified.

APPLICATION EXAMPLE 9

It is preferable that the physical quantity sensor according to the application example further includes a support substrate that supports the angular velocity detection element, and the shield unit is disposed to be separated from the support substrate.

With this configuration, the degree of freedom of disposition or the shape of the shield unit is added.

APPLICATION EXAMPLE 10

An electronic apparatus according to this application example includes the physical quantity sensor according to the application example.

With this configuration, it is possible to obtain the electronic apparatus with high reliability.

APPLICATION EXAMPLE 11

A moving object according to this application example includes the physical quantity sensor according to the application example.

With this configuration, it is possible to obtain the moving object with high reliability.

BRIEF DESCRIPTION OF THE DRAWINGS

The invention will be described with reference to the accompanying drawings, wherein like numbers reference like elements.

FIGS. 6A and 6B are plan views illustrating an operation of the angular velocity detection element illustrated in FIG. 5.

DESCRIPTION OF EXEMPLARY EMBODIMENTS

Hereinafter, a physical quantity sensor, an electronic apparatus, and a moving object according to the invention will be described in detail with reference to the appended drawings according to embodiments.

First Embodiment

Figure 1:
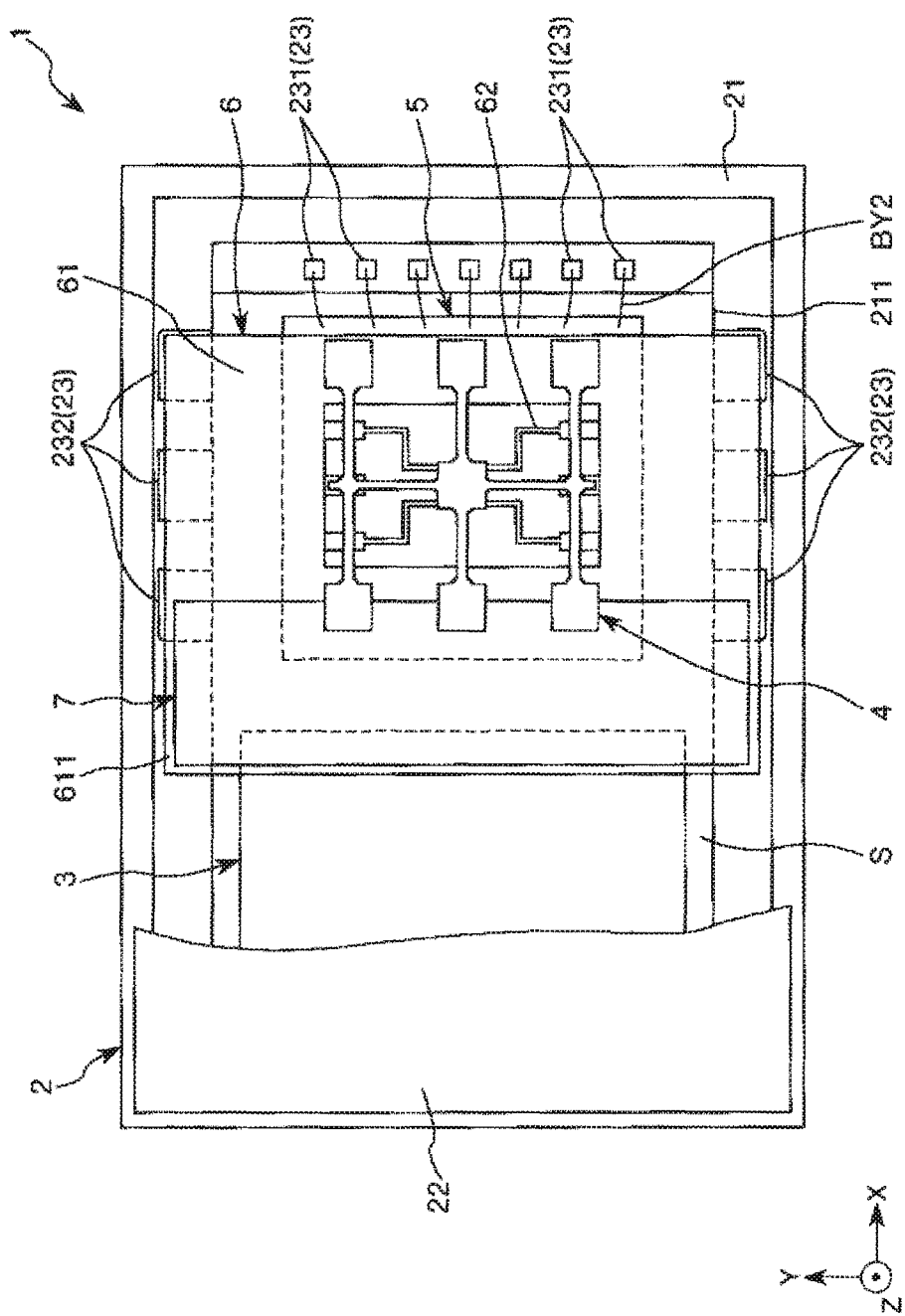
FIG. 1 is a plan view illustrating a physical quantity sensor according to a first embodiment of the invention.
Figure 2:
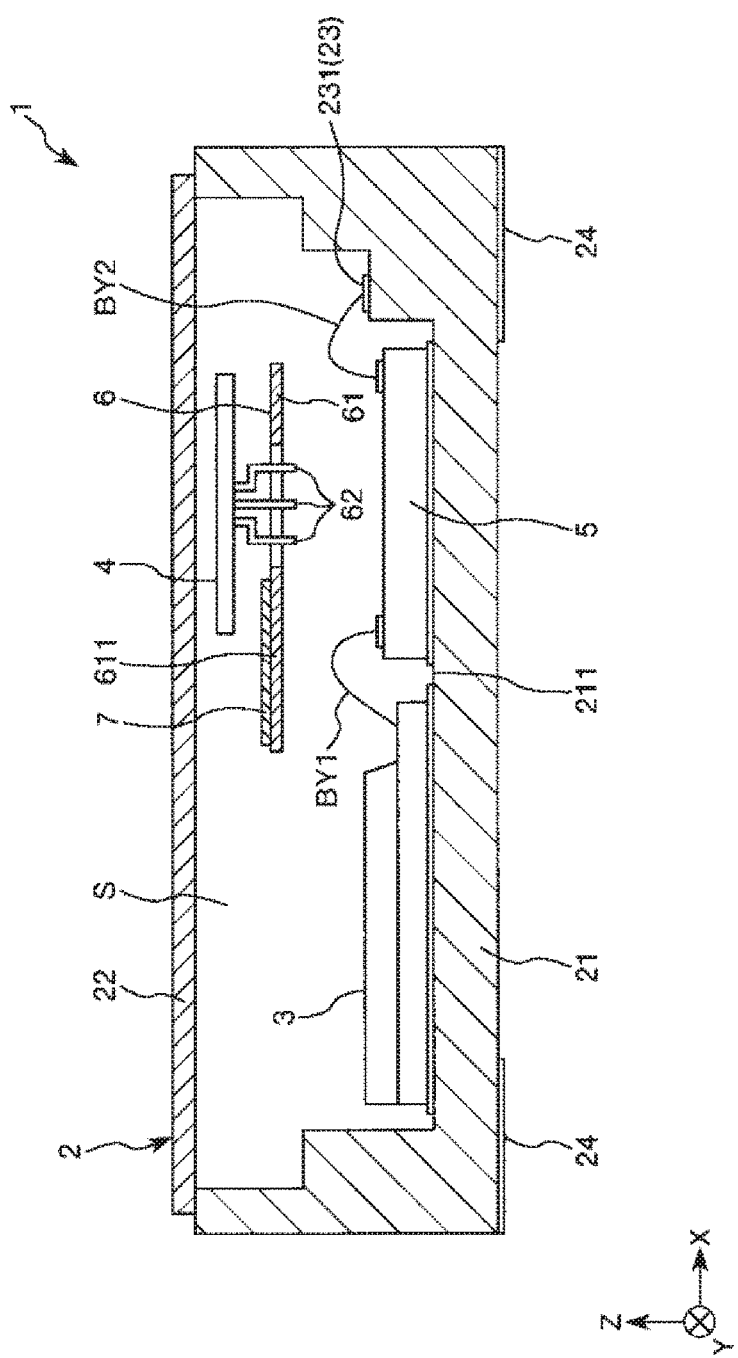
FIG. 2 is a sectional view illustrating the physical quantity sensor illustrated in FIG. 1.
Figure 3:
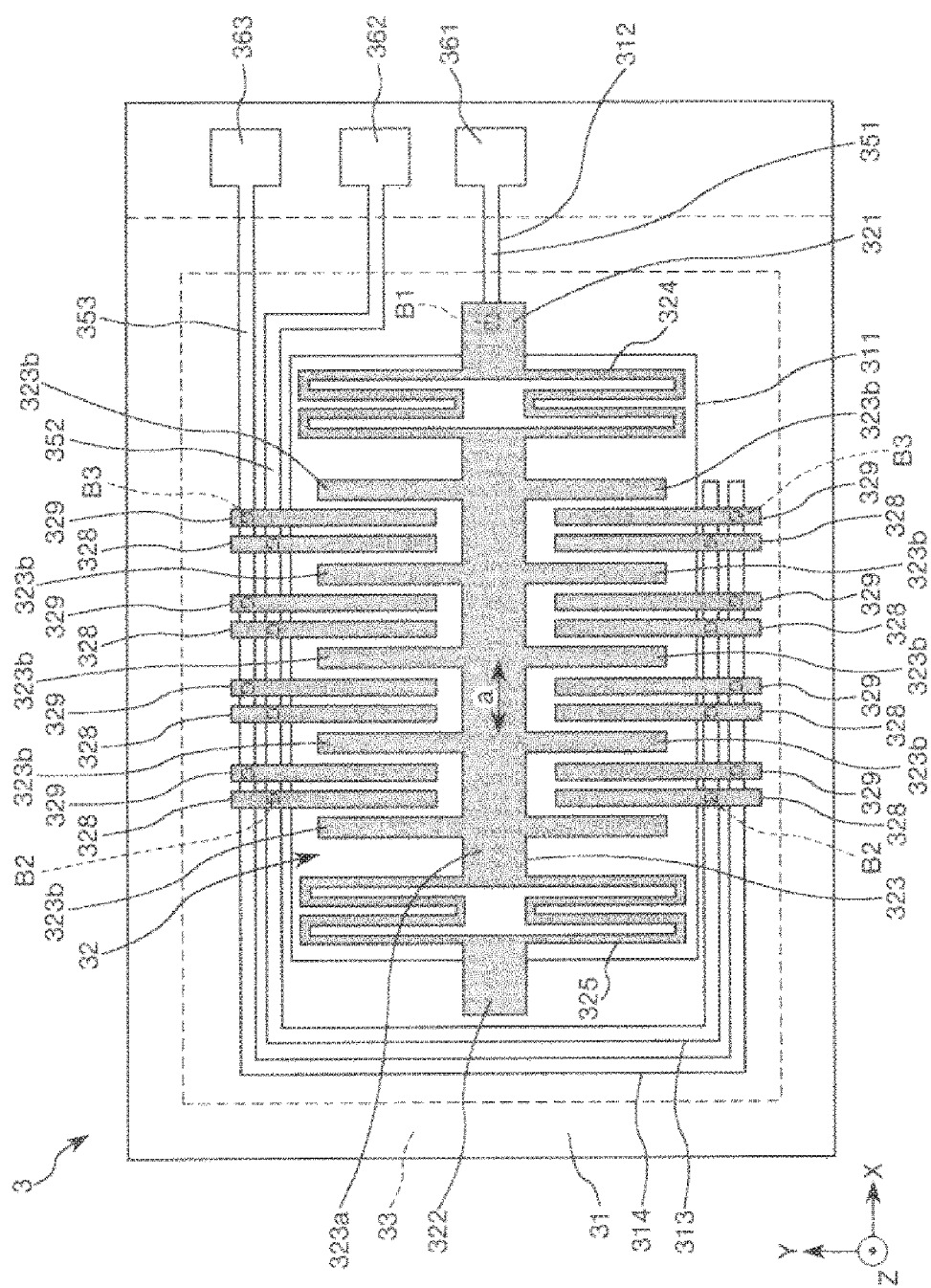
FIG. 3 is a plan view illustrating an acceleration detection element.
Figure 4:
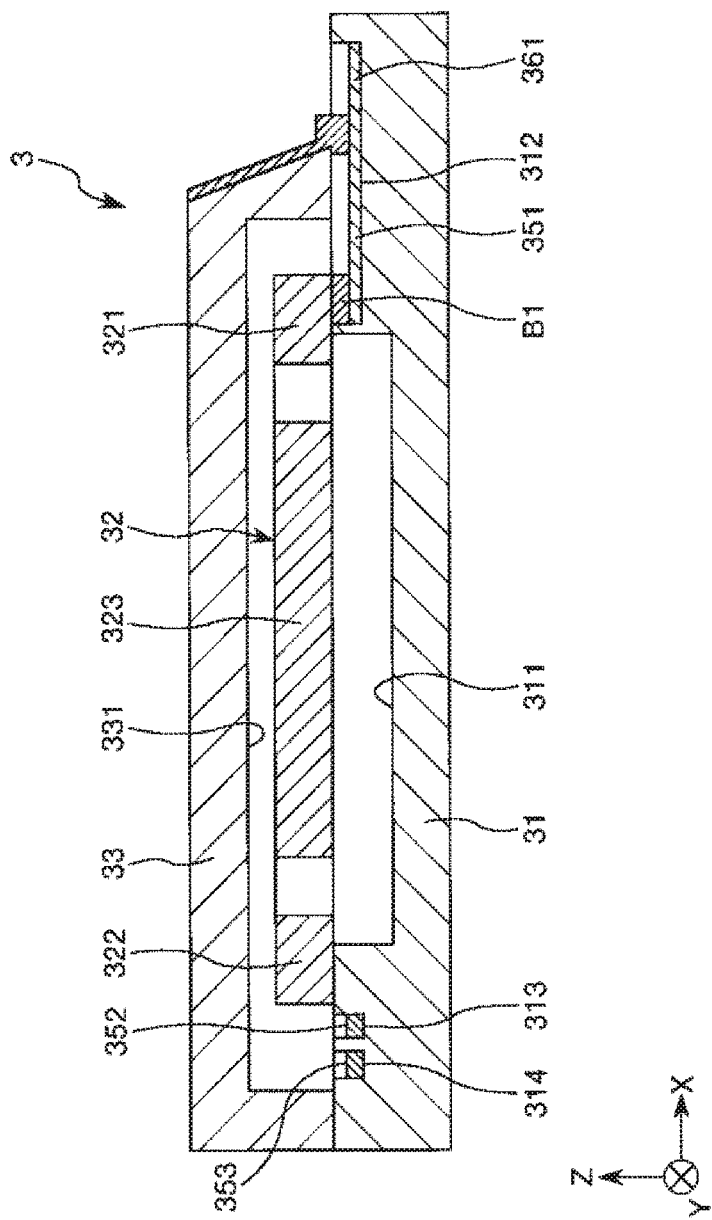
FIG. 4 is a sectional view illustrating the acceleration detection element illustrated in FIG. 3.
Figure 5:
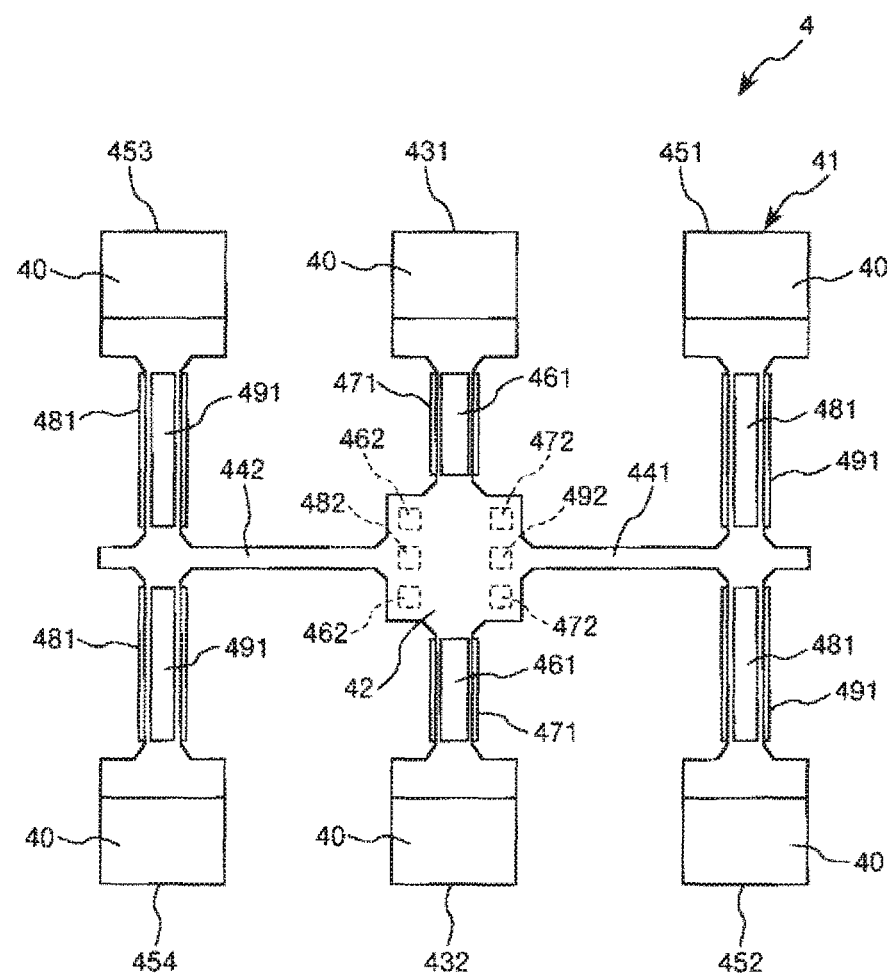
FIG. 5 is a plan view illustrating an angular velocity detection element.
Figure 7:
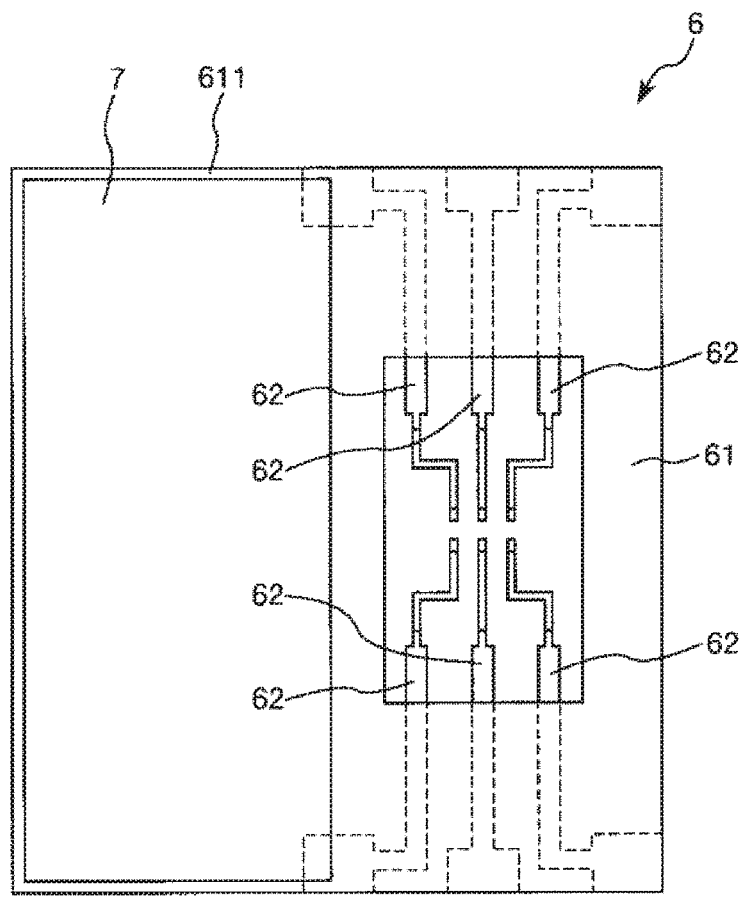
FIG. 7 is a plan view illustrating a support substrate.
Figure 7:
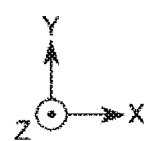
Figure 8:
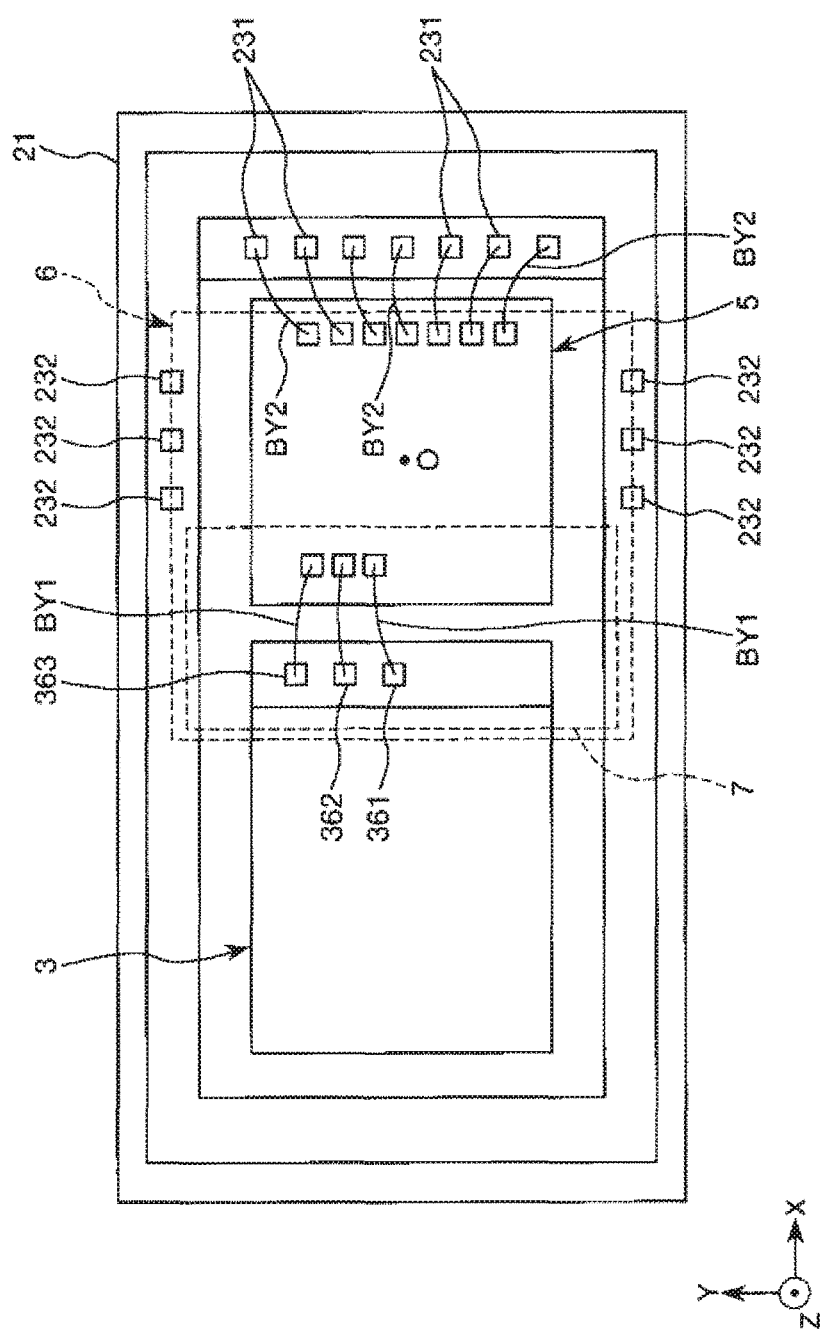
FIG. 8 is a plan view illustrating a connection state of an IC.

FIG. 1 is a plan view illustrating a physical quantity sensor according to a first embodiment of the invention. FIG. 2 is a sectional view illustrating the physical quantity sensor illustrated in FIG. 1. FIG. 3 is a plan view illustrating an acceleration detection element. FIG. 4 is a sectional view illustrating the acceleration detection element illustrated in FIG. 3. FIG. 5 is a plan view illustrating an angular velocity detection element. FIGS. 6A and 6B are plan views illustrating an operation of the angular velocity detection element illustrated in FIG. 5. FIG. 7 is a plan view illustrating a support substrate. FIG. 8 is a plan view illustrating a connection state of an IC. Hereinafter, to facilitate the description, the upper side of FIG. 2 is referred to as "upper" and the lower side of FIG. 2 is referred to as "lower". Three axes perpendicular to each other are referred to as X, Y, and Z axes. A direction parallel to the X axis is referred to as an "X axis direction", a direction parallel to the Y axis is referred to as a "Y axis direction", and a direction parallel to the Z axis is referred to as a "Z axis direction".

A physical quantity sensor 1 illustrated in FIG. 1 includes a package 2, an acceleration detection element 3 accommodated in the package 2, an angular velocity detection element 4, an IC (circuit) 5, a support substrate 6, and a shield unit 7. Hereinafter, these units will be described sequentially in detail.

Package

First, the package 2 will be described. As illustrated in FIG. 1, the package 2 includes a base 21 that has a cavity shape and includes a concave portion 211 opened to a lower surface and a lid 22 that has a plate shape and blocks an opening of the concave portion 211 to be joined to the base 21. The package 2 has an internal space S formed in such a manner that the opening of the concave portion 211 is blocked by the lid 22. The acceleration detection element 3, the angular velocity detection element 4, and the IC 6 are accommodated in the internal space S. The internal space S is sealed in an airtight manner so that a depressurization state (preferably, a vacuum state) is achieved.

The constituent material of the base 21 is not particularly limited. For example, any of various ceramics such as aluminum oxide, a glass material, or a metal material can be used. The constituent material of the lid 22 is not particularly limited. A member with a linear expansion coefficient approximate to the constituent material of the base 21 may be used. For example, when the above-described ceramics is used as the constituent material of the base 21, an alloy such as Kovar is preferably used. A method of joining the base 21 to the lid 22 is not particularly limited. For example, the base 21 and the lid 22 may be joined with a metalized layer interposed therebetween or may be joined via an adhesive.

As illustrated in FIG. 1, a plurality of internal terminals 23 fronting the internal space S are installed in the base 21. The internal terminals 23 include first internal terminals 231 for an IC 5 and second internal terminals 232 for the angular velocity detection element 4. Some of the first internal terminals 231 are electrically connected to the second internal terminals 232 via internal wirings (not illustrated) formed in the base 21. The other remaining internal terminals 231 are electrically connected to external terminals 24 disposed on the bottom surface of the base 21 via the internal wirings (see FIG. 2). The numbers of internal terminals 23 and external terminals 24 are not particularly limited, but may be appropriately set, as necessary.

Acceleration Detection Element

The acceleration detection element 3 is fixed to the bottom surface of the concave portion 211 of the base 21 with, for example, a fixing member such as a silver paste or an adhesive interposed therebetween. The acceleration detection element 3 is not particularly limited as long as the acceleration detection element 3 can detect acceleration in at least one direction. For example, the acceleration detection element 3 can be configured as follows.

As illustrated in FIG. 3, the acceleration detection element 3 includes a base substrate 31, an element portion 32 that is supported by the base substrate 31, and a lid 33 that covers the element portion 32 and is joined to the base substrate 31.

The base substrate 31 is made of, for example, glass and is formed in a plate shape. A concave portion 311 is formed on the upper surface of the base substrate 31. Concave portions 312, 313, and 314 are formed on the upper surface of the base substrate 31. A wiring 351 and a terminal 361 are disposed in the concave portion 312, a wiring 352 and a terminal 362 are disposed in the concave portion 313, and a wiring 353 and a terminal 363 are disposed in the concave portion 314. The terminals 361, 362, and 363 are disposed on portions of the base substrate 31 exposed from the lid 33.

The element portion 32 includes support portions 321 and 322, a movable portion 323, connection portions 324 and 325, first fixed electrode fingers 328, and second fixed electrode fingers 329. The movable portion 323 includes a base portion 323a and a plurality of movable electrode fingers 323b protruding from the base portion 323a on both sides of the Y axis direction. The element portion 32 is formed of, for example, a silicon substrate doped with impurities such as phosphorus or boron.

The support portions 321 and 322 are joined to the upper surface of the base substrate 31. The support portion 321 is electrically connected to the wiring 351 via a conductive bump B1. The movable portion 323 is formed between the support portions 321 and 322. The movable portion 323 is connected to the support portion 321 via the connection portion 324 and is connected to the support portion 322 via the connection portion 325. The movable portion 323 can be displaced relative to the support portions 321 and 322 in the X axis direction, as indicated by an arrow a.

The plurality of first fixed electrode fingers 328 are disposed on one side of the corresponding movable electrode fingers 323b in the X axis direction and are arranged to in a comb form occluding at intervals to the corresponding movable electrode fingers 323b. The plurality of first fixed electrode fingers 328 are electrically connected to the wiring 352 via a conductive bump B2.

On the other hand, the plurality of second fixed electrode fingers 329 are disposed on the one side of the corresponding movable electrode fingers 323b in the X axis direction and are arranged in a comb form occluding at intervals to the corresponding movable electrode fingers 323b. The plurality of second fixed electrode fingers 329 are electrically connected to the wiring 353 via a conductive bump B3.

The lid 33 is formed in a plate form, as illustrated in FIG. 4. A concave portion 331 is formed on the lower surface of the lid 33. The lower surface of the lid 33 is joined to the upper surface of the base substrate 31.

The acceleration detection element 3 having the above-described configuration detects acceleration as follows. That is, when acceleration in the X axis direction is applied, the movable portion 323 is displaced in the X axis direction based on the magnitude of the acceleration while elastically deforming the connection portion 324 and 325. With the displacement, gaps between the movable electrode fingers 323b and the first fixed electrode fingers 328 and gaps between the movable electrode fingers 323b and the second fixed electrode fingers 329 are varied, and thus electrostatic capacitances between the movable electrode fingers 323b and the first fixed electrode fingers 328 and electrostatic capacitances between the movable electrode fingers 323b and the second fixed electrode fingers 329 are changed. The change in the electrostatic capacitances is output as a detection signal via the terminal 361 connected to the movable portion 323 by applying carrier waves used to detect the electrostatic capacitance from the IC 5 to the first fixed electrode fingers 328 and the second fixed electrode fingers 329, and then the IC 5 detects the acceleration based on the detection signal.

Angular Velocity Detection Element

The angular velocity detection element 4 is not particularly limited as long as the angular velocity detection element 4 can detect an angular velocity around a predetermined axis. For example, the angular velocity detection element 4 can be configured as follows.

The angular velocity detection element 4 includes a vibrator element 41 formed by patterning the quartz crystal substrate and an electrode installed in the vibrator element 41, as illustrated in FIG. 5.

The vibrator element 41 includes a base portion 42, detection arms 431 and 432 that extend from the base portion 42 on both sides of the X axis direction, connection arms 441 and 442 that extend from the base portion 42 on both sides of the Y axis direction, drive arms 451 and 452 that extend from the connection arm 441 on both sides of the X axis direction, and drive arms 453 and 454 that extend from the connection arm 442 on both sides of the X axis direction.

The electrode includes detection signal electrodes 461, detection signal terminals 462, detection grounding electrodes 471, detection grounding terminals 472, drive signal electrodes 481, a drive signal terminals 482, drive grounding electrodes 491, and a drive grounding terminal 492.

The detection signal electrodes 461 are disposed on the upper surface and the lower surface of the detection arms 431 and 432. The detection grounding electrodes 471 are disposed on both side surfaces of the detection arms 431 and 432. The drive signal electrodes 481 are disposed on the upper and lower surfaces of the drive arms 451 and 452 and both side surfaces of the drive arms 453 and 454. The drive grounding electrodes 491 are disposed on the upper and lower surfaces of the drive arms 453 and 454 and both side surfaces of the drive arms 451 and 452.

Two detection signal terminals 462, two detection grounding terminals 472, the drive signal terminal 482, and the drive grounding terminal 492 are disposed on the lower surface of the base portion 42. One of the detection signal terminals 462 is connected to the detection signal electrode 461 on the detection arm 431 and the other of the detection signal terminals 462 is connected to the detection signal electrode 461 on the detection arm 432. One of the detection grounding terminals 472 is connected to the detection grounding electrode 471 on the detection arm 431 and the other of the detection grounding terminals 472 is connected to the detection grounding electrode 471 on the detection arm 432. The drive signal terminal 482 is connected to the drive signal electrodes 481 on the drive arms 451 to 454. The drive grounding terminal 492 is connected to the drive grounding electrodes 491 on the drive arms 451 to 454.

The angular velocity detection element 4 with the above-described configuration detects an angular velocity as follows. When drive signals are applied between the drive signal electrodes 481 and the drive grounding electrodes 491 in a state in which no angular velocity is applied to the angular velocity detection element 4, the drive arms 451 to 454 perform flexural vibration in directions indicated by arrows A, as illustrated in FIG. 6A. At this time, since the drive arms 451 to 454 vibrate symmetrically, the detection arms 431 and 432 rarely vibrate. Then, in this state, when the angular velocity around the Z axis is applied, Coriolis forces are operated to the drive arms 451 to 454, as illustrated in FIG. 6B, vibration in directions indicated by arrows B are excited, and the detection arms 431 and 432 perform flexural vibration in directions indicated by arrows C to respond to this vibration. Charges generated in the detection arms 431 and 432 by this vibration are extracted as a detection signal from between the detection signal electrodes 461 and detection ground electrodes 471, and the IC 5 detects an angular velocity based on this signal.

Support Substrate

As illustrated in FIG. 1, the support substrate 6 has a function of supporting the angular velocity detection element 4 from the lower side and fixing the package 2 and a function of electrically connecting the angular velocity detection element 4 and the second internal terminals 232. The support substrate 6 is disposed so that a space in which the IC 5 is disposed remains on its lower side. Therefore, in a state in which the angular velocity detection element 4 is supported by the support substrate 6, the support substrate 6 is disposed to be deviated from the angular velocity detection element 4 in the height direction (the Z axis direction).

The support substrate 6 is a tape automated bonding (TAB) mounting substrate known in the related art. As illustrated in FIG. 7, the support substrate 6 includes a frame-shaped base portion 61 and six leads 62 installed in the base portion 61. The leads 62 are fixed to the lower surface of the base portion 61 and the front ends of the leads 62 extend into an opening of the base portion 61. The front ends of the leads 62 are electrically connected to the terminals 462, 472, 482, and 492 of the angular velocity detection element 4 via conductive adhesives (not illustrated). On the other hand, the base ends of the leads 62 are electrically connected to the second internal terminals 232 via conductive adhesives (not illustrated).

IC

As illustrated in FIG. 1, the IC 5 is fixed to the bottom surface of the concave portion 211 of the base 21 with, for example, a fixing member such as a silver paste or an adhesive interposed therebetween. The IC 5 is disposed to be arranged horizontally with the acceleration detection element 3 and is disposed to vertically overlap the angular velocity detection element 4 and the support substrate 6. That is, in a plan view in the +Z axis direction, the IC 5 is disposed not to overlap the acceleration detection element 3 and is disposed to overlap the angular velocity detection element 4 and the support substrate 6.

As illustrated in FIG. 8, the IC 5 is electrically connected to the terminals 361, 362, and 363 of the acceleration detection element 3 via bonding wires BY1 and is electrically connected to the first internal terminals 231 via bonding wires BY2. The bonding wires BY1 include wires (acceleration detection signal wirings) through which a detection signal from the acceleration detection element 3 propagates and wires (carrier-wave wirings) through which a carrier wave applied to the acceleration detection element 3 propagates. The bonding wires BY2 include wires (angular velocity detection signal wirings) through which a detection signal from the angular velocity detection element 4 propagates and wires (drive signal wirings) through which a drive signal applied to the angular velocity detection element 4 propagates.

The IC 5 includes, for example, a drive circuit that applies a carrier wave to the acceleration detection element 3, a detection circuit that detects acceleration based on a detection signal from the acceleration detection element 3, a drive circuit that drives the angular velocity detection element 4, a detection circuit that detects an angular velocity based on a detection signal from the angular velocity detection element 4, an A/D conversion circuit that converts an analog signal into a digital signal, and an interface that communicates with an external device.

Here, the plurality of bonding wires BY2 include, for example, wires (digital signal wires) through which an output signal obtained by converting detected acceleration or a detected angular velocity into a digital signal propagates or a digital signal of a power supply or the like for the interface included in the IC 5 propagates. Therefore, in the physical quantity sensor 1, the bonding wires BY2 are disposed to be separated from the bonding wires BY1 through which a detection signal or a carrier wave of the acceleration detection element 3 propagates, and thus the above-described digital signal is rarely mixed with the detection signal or the carrier wave of the acceleration detection element 3. Specifically, in a plan view, the bonding wires BY2 are disposed on the −X axis side and the bonding wires BY1 are disposed on the +X axis side with respect to a center O of the IC 5, so that the bonding wires BY2 are separated from the bonding wires BY1.

Shield Unit

The shield unit 7 is installed so that the drive signal applied to the angular velocity detection element 4 is rarely mixed with the detection signal or the carrier wave of the acceleration detection element 3. Accordingly, noise is rarely ridden on the detection signal or the carrier wave of the acceleration detection element 3, and thus acceleration can be detected more accurately by the IC 5.

As illustrated in FIGS. 1 and 2, the base portion 61 of the support substrate 6 includes an extension portion 611 extending on the −X axis side to overlap the angular velocity detection element 4 in the plan view. The shield unit 7 is disposed on the upper surface of the extension portion 611. The shield unit 7 is formed of, for example, a conductive film such as a metal film and is grounded. By disposing the shield unit 7 on the support substrate 6, the configuration of the physical quantity sensor 1 is further simplified. The shield unit 7 may be connected to a reference potential (fixed potential) without being grounded.

At least apart of the shield unit 7 is located between the bonding wires BY1, and driving wirings (the leads 62, the drive signal terminal 482, the drive signal electrodes 481 and the like) through which the drive signal of the angular velocity detection element 4 propagates and the angular velocity detection wirings (the leads 62, the detection signal terminals 462, the detection signal electrode 461, and the like) through which the detection signal of the angular velocity detection element 4 propagates. Therefore, the drive signal or the detection signal of the angular velocity detection element 4 is rarely mixed with the detection signal or the carrier wave of the acceleration detection element 3 via the bonding wires BY1. As a result, noise is rarely ridden on the detection signal or the carrier wave of the acceleration detection element 3, and thus acceleration can be detected with high accuracy by the IC 5.

In particular, at least a part of the shield unit 7 is located between the angular velocity detection element 4 and the acceleration detection element 3 in a side view (when viewed from the horizontal direction), as illustrated in FIG. 2, and at least a part of the shield unit 7 is located between the angular velocity detection element 4 and the acceleration detection element 3 in a plan view (when viewed from the vertical direction), as illustrated in FIG. 1. Therefore, it is possible to shield the drive signal or the detection signal of the angular velocity detection element 4 more effectively. Therefore, the signal is rarely mixed with the detection signal or the carrier wave of the acceleration detection element 3 via the bonding wires BY2.

The following advantages can be obtained. That is, as illustrated in FIG. 5, mass adjustment films 40 made of a metal and formed to adjust vibration balance (reduce vibration leakage) are disposed at the front ends of the drive arms 451 to 454 of the angular velocity detection element 4. The vibration balance is adjusted by removing parts (adjustment portions) of the mass adjustment films 40 by laser radiation in the state in which the angular velocity detection element 4 is fixed to the package 2. At this time, as illustrated in FIG. 2, at least a part of the shield unit 7 is located between the adjustment portions of the mass adjustment films 40 of the angular velocity detection element 4 and the bonding wires BY1 in the side view (when viewed from the horizontal direction), as illustrated in FIG. 2, and at least a part of the shield unit 7 is located between the adjustment portions of the mass adjustment films 40 of the angular velocity detection element 4 and the bonding wires BY1 in a plan view (when viewed from the vertical direction), as illustrated in FIG. 1. Therefore, a metal material scattering at the time of removing of the parts of the mass adjustment films 40 is blocked by the shield unit 7 and is rarely attached to the bonding wires BY1. Therefore, for example, it is possible to prevent the bonding wires BY1 adjacent to each other from being short-circuited more efficiently. The shield unit 7 may not necessarily be formed to obtain this advantage. For example, by omitting the shield unit 7 in the physical quantity sensor 1 in FIG. 2 and blocking the scattering metal material by the extension portion 611, the scattering metal material can be prevented from being attached to the bonding wires BY1.

Second Embodiment

Next, a second embodiment of the physical quantity sensor according to the invention will be described.

Figure 9:
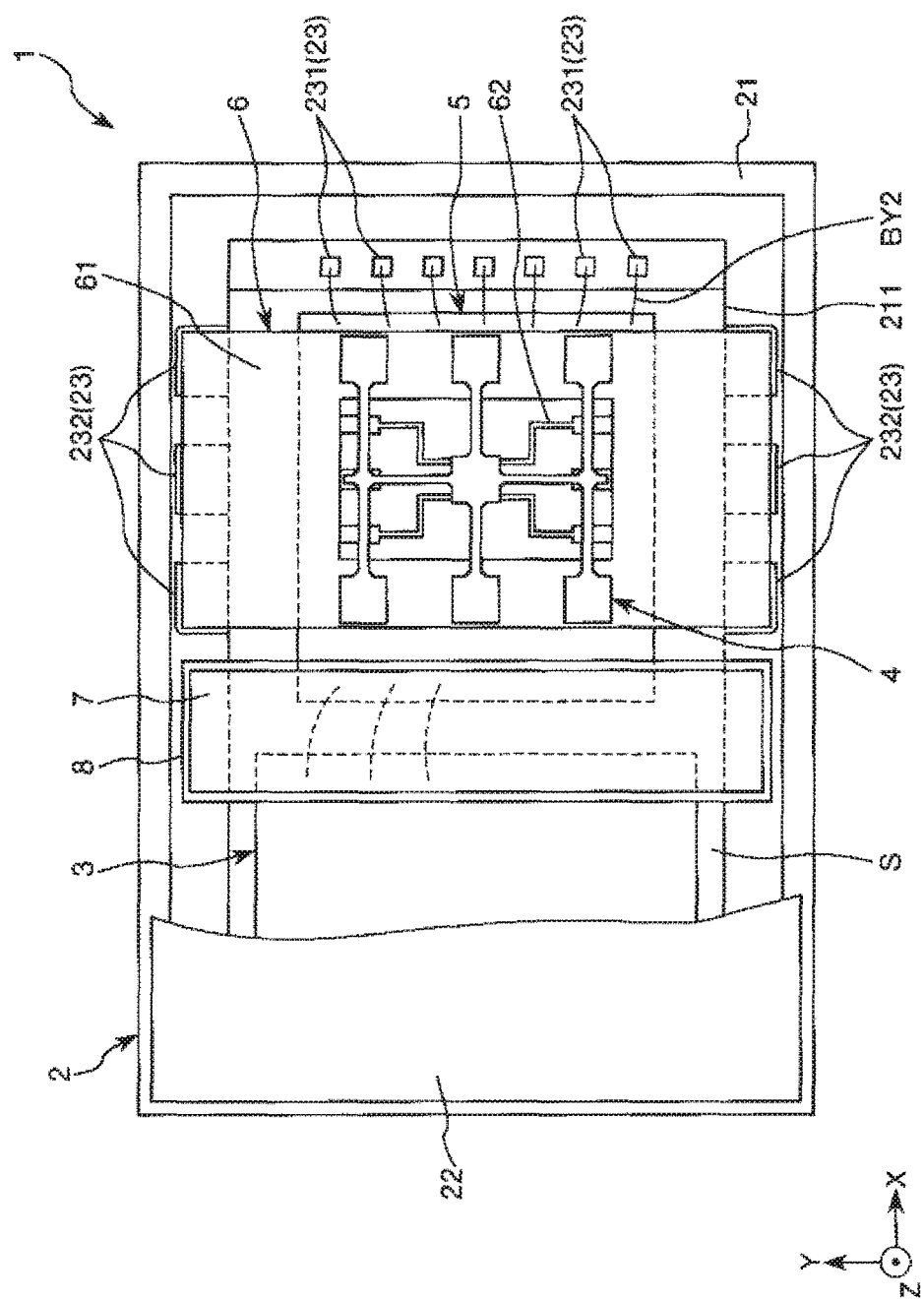
FIG. 9 is a plan view illustrating a physical quantity sensor according to a second embodiment of the invention.

FIG. 9 is a plan view illustrating the physical quantity sensor according to the second embodiment of the invention.

The physical quantity sensor according to the embodiment is the same as the physical quantity sensor according to the above-described first embodiment except that the configuration of a shield unit is different.

In the following description, differences between the physical quantity sensor according to the second embodiment and the physical quantity sensor according to the above-described embodiment will be mainly described and the same matters will not be described. In FIG. 9, the same reference numerals are given to the same configurations as those of the above-described embodiment.

In the embodiment, as illustrated in FIG. 9, the shield unit 7 is disposed on a substrate 8 separated from the support substrate 6. In this way, by separating the shield unit 7 from the support substrate 6, the degree of freedom of disposition of the shield unit 7 is improved further than in the above-described first embodiment and the shield unit 7 is easily disposed at a more proper position.

Even in the foregoing second embodiment, it is possible to obtain the same advantages as those of the above-described first embodiment.

Third Embodiment

Next, a third embodiment of the physical quantity sensor according to the invention will be described.

Figure 10:
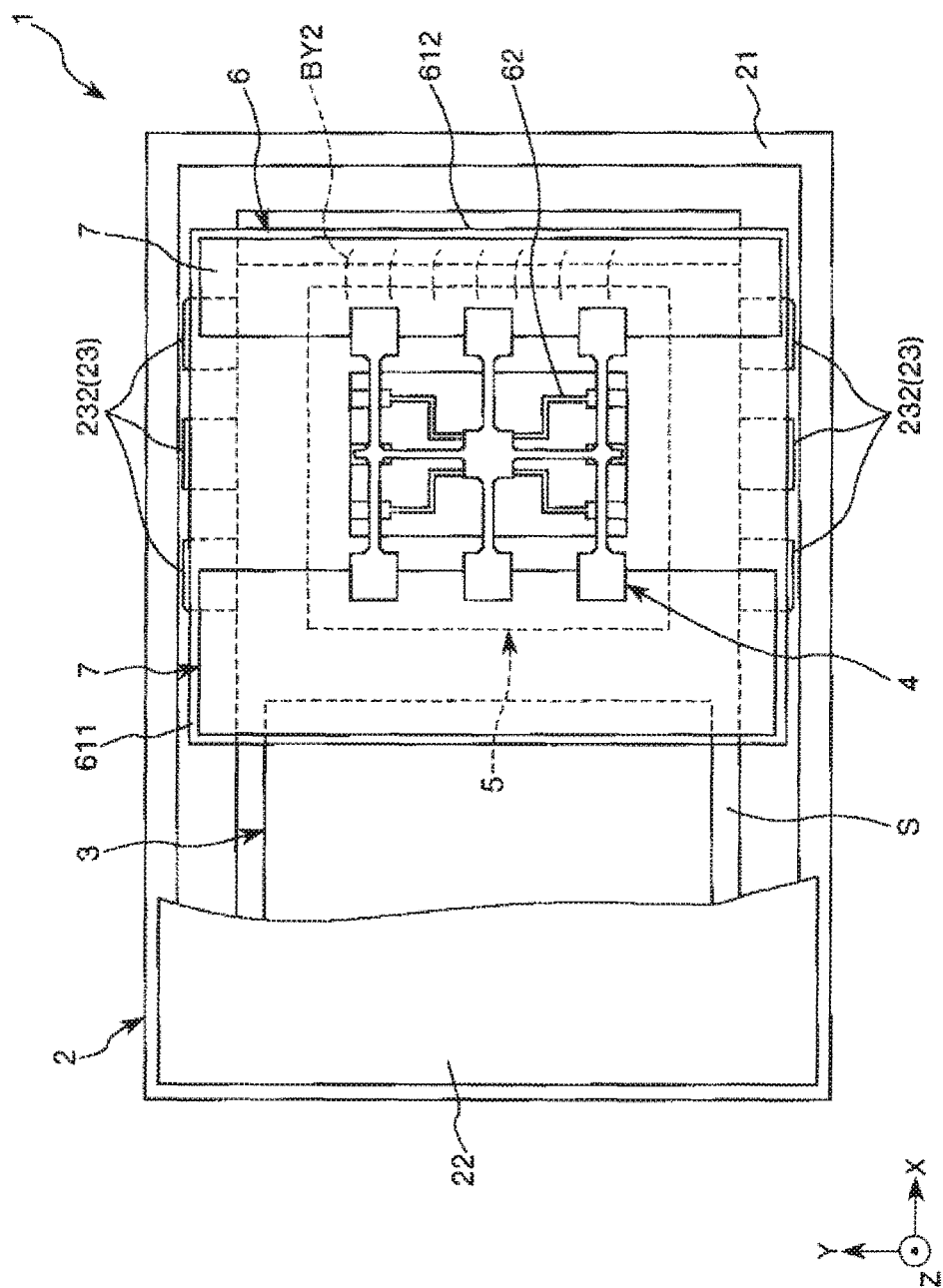
FIG. 10 is a plan view illustrating a physical quantity sensor according to a third embodiment of the invention.
Figure 11:
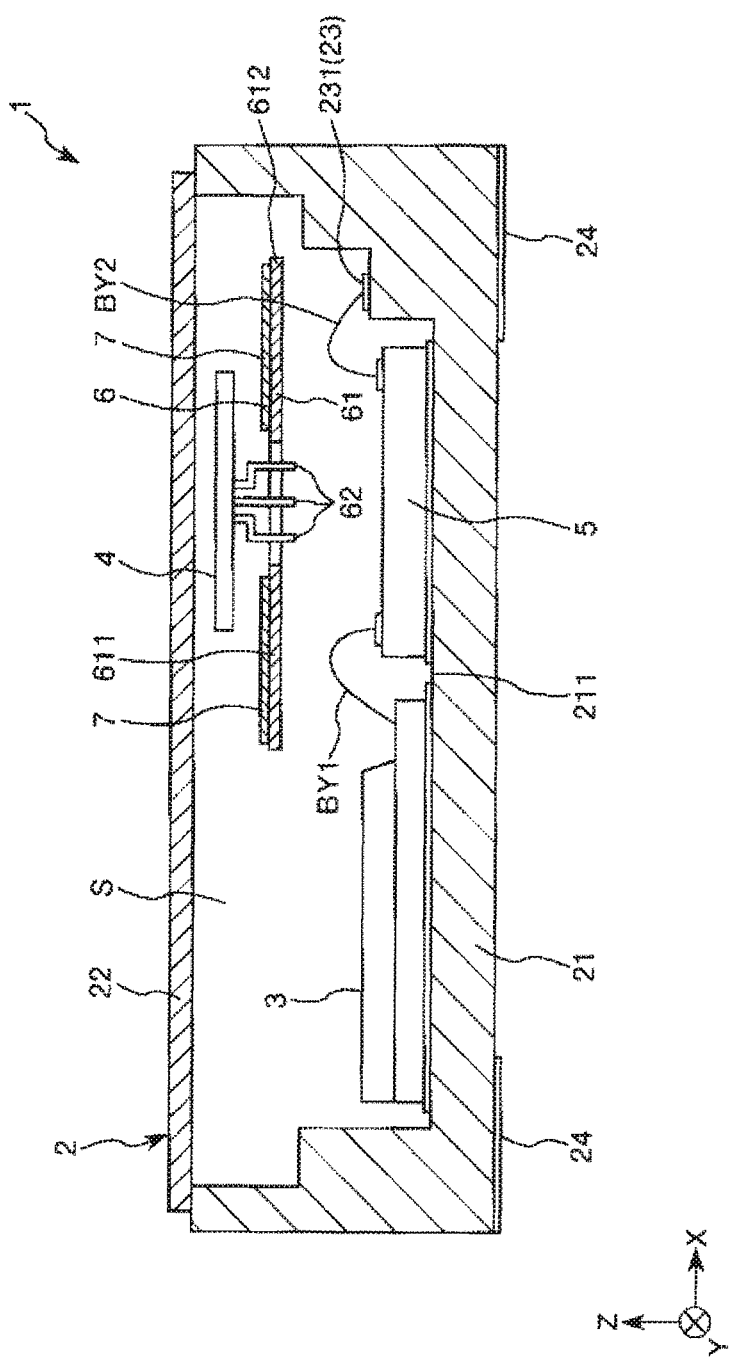
FIG. 11 is a sectional view illustrating the physical quantity sensor illustrated in FIG. 10.

FIG. 10 is a plan view illustrating the physical quantity sensor according to the third embodiment of the invention. FIG. 11 is a sectional view illustrating the physical quantity sensor illustrated in FIG. 10.

The physical quantity sensor according to the embodiment is the same as the physical sensor according to the above-described first embodiment except that the configuration of a shield unit is different.

In the following description, differences between the physical quantity sensor according to the third embodiment and the physical quantity sensor according to the above-described embodiment will be mainly described and the same matters will not be described. In FIG. 10, the same reference numerals are given to the same configurations as those of the above-described embodiment.

In the embodiment, as illustrated in FIGS. 10 and 11, the base portion 61 of the support substrate 6 includes an extension portion 612 extending on the +x axis side so that the extension portion 612 overlaps the bonding wires BY2 in the plan view. The shield unit 7 is also disposed on the upper surface of the extension portion 612. Since the shield unit 7 on the extension portion 612 is located between the bonding wires BY2 and the angular velocity detection element 4, a digital signal propagating through the bonding wires BY2 is rarely mixed in a detection signal via the detection signal electrode 461 of the angular velocity detection element 4. Therefore, noise is rarely ridden on the detection signal from the angular velocity detection element 4 and an angular velocity can be detected by the IC 5 with higher accuracy.

Even in the foregoing third embodiment, it is possible to obtain the same advantages as those of the above-described first embodiment.

Fourth Embodiment

Next, a fourth embodiment of the physical quantity sensor according to the invention will be described.

Figure 12:
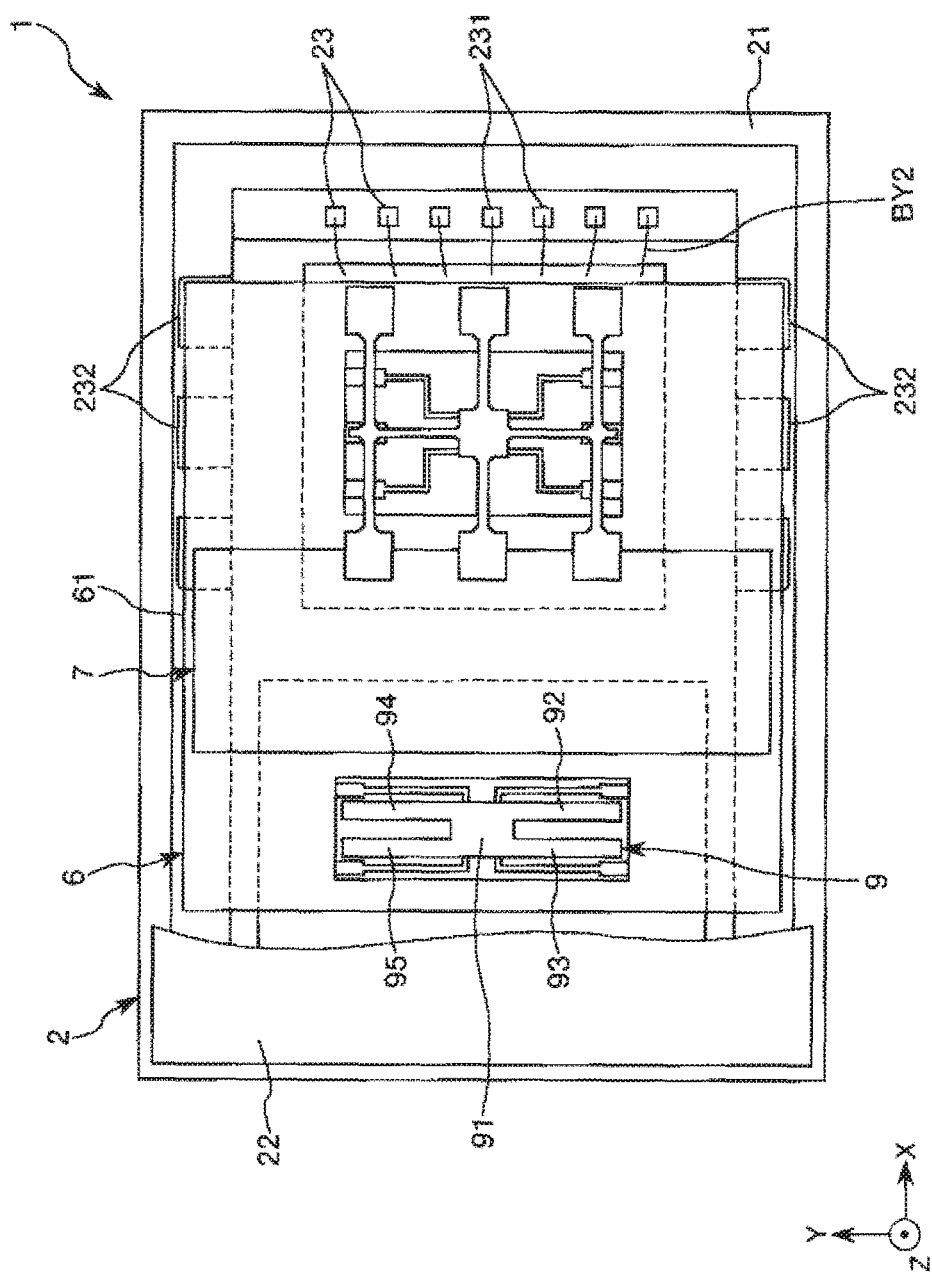
FIG. 12 is a plan view illustrating a physical quantity sensor according to a fourth embodiment of the invention.
Figure 13:
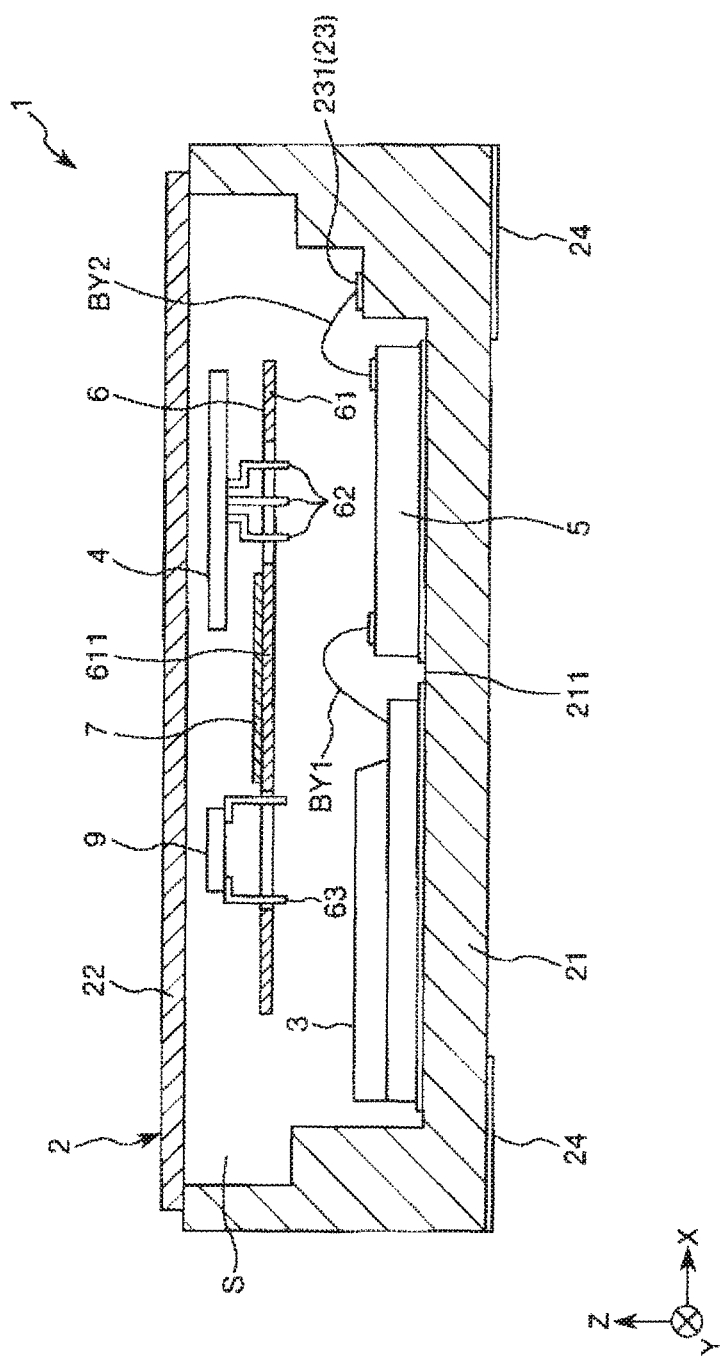
FIG. 13 is a sectional view illustrating the physical quantity sensor illustrated in FIG. 12.

FIG. 12 is a plan view illustrating the physical quantity sensor according to the fourth embodiment of the invention. FIG. 13 is a sectional view illustrating the physical quantity sensor illustrated in FIG. 12.

The physical quantity sensor according to the embodiment is the same as the physical sensor according to the above-described first embodiment except that two angular velocity detection elements are installed.

In the following description, differences between the physical quantity sensor according to the fourth embodiment and the physical quantity sensor according to the above-described embodiment will be mainly described and the same matters will not be described. In FIG. 12, the same reference numerals are given to the same configurations as those of the above-described embodiment.

In the embodiment, as illustrated in FIGS. 12 and 13, the physical quantity sensor 1 further includes an angular velocity detection element 9 capable of detecting an angular velocity around the Y axis. The angular velocity detection element 9 is supported by the support substrate 6 and are electrically connected to the IC 5 via the leads 63, as in the angular velocity detection element 4. The angular velocity detection element 9 is disposed to be arranged horizontally with the angular velocity detection element 4 and is disposed to vertically overlap the acceleration detection element 3. The shield unit 7 is located between the angular velocity detection element 9 and the bonding wires BY1.

The angular velocity detection element 9 includes a base portion 91, a pair of drive arms 92 and 93 extending from the base portion 91 on the −Y axis side, and a pair of detection arms 94 and 95 extending from the base portion 91 on the +Y axis side. A drive signal electrode and a drive grounding electrode (neither of which is illustrated) are disposed in the drive arms 92 and 93. A detection signal electrode and a detection grounding electrode (neither of which is illustrated) are disposed in the detection arms 94 and 95.

Even in the foregoing fourth embodiment, it is possible to obtain the same advantages as those of the above-described first embodiment.

Electronic Apparatus

Next, an electronic apparatus including the physical quantity sensor 1 will be described in detail with reference to FIGS. 14 to 16.

Figure 14:
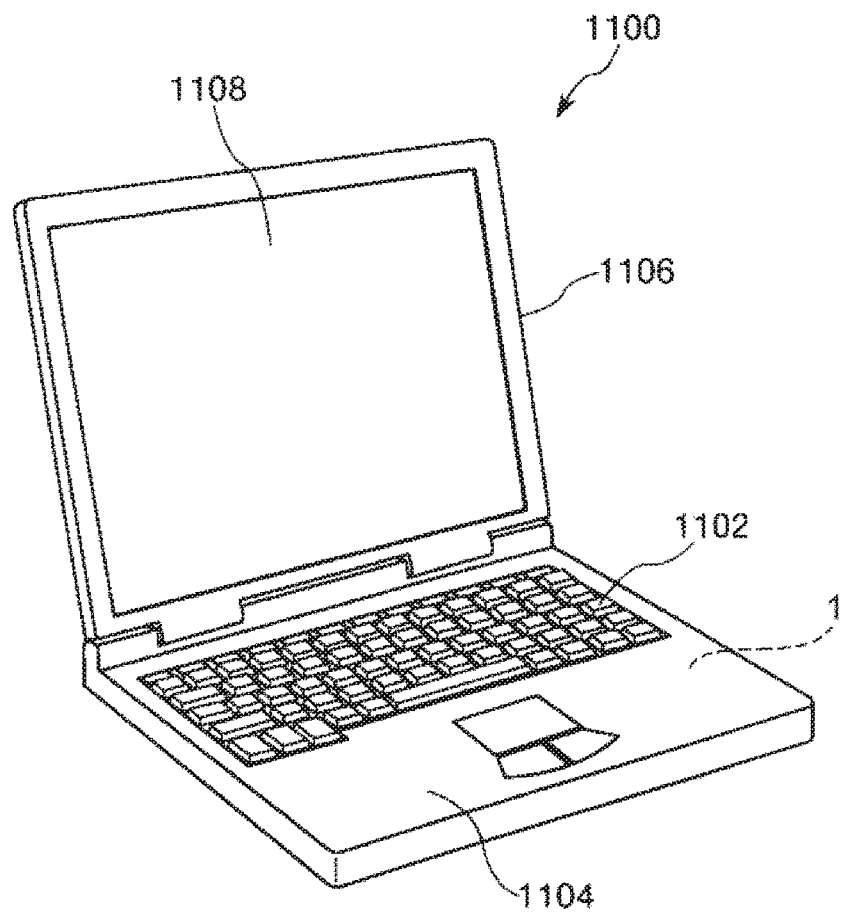
FIG. 14 is a perspective view illustrating the configuration of a mobile type (or notebook type) personal computer to which an electronic apparatus according to the invention is applied.

FIG. 14 is a perspective view illustrating the configuration of mobile type (or notebook type) personal computer to which the electronic apparatus according to the invention is applied.

In FIG. 14, the personal computer 1100 is configured to include a body unit 1104 including a keyboard 1102 and a display unit 1106 including a display portion 1108. The display unit 1106 is supported to be rotated with a hinge structure unit interposed with the body unit 1104. In the personal computer 1100, the physical quantity sensor 1 detecting an angular velocity and acceleration is included.

Figure 15:
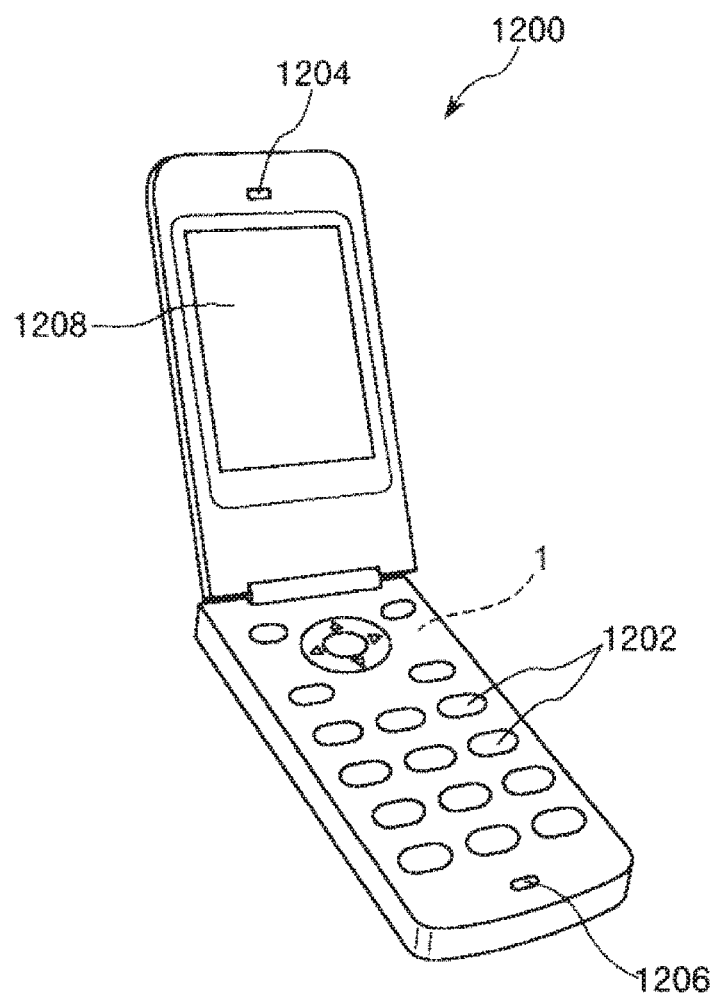
FIG. 15 is a perspective view illustrating the configuration of a mobile phone (including a smartphone or a PHS) to which an electronic apparatus according to the invention is applied.

FIG. 15 is a perspective view illustrating the configuration of a mobile phone (including a smartphone or a PHS) to which the electronic apparatus according to the invention is applied.

In FIG. 15, the mobile phone 1200 includes a plurality of operation buttons 1202, an earpiece 1204, and a mouthpiece 1206. A display unit 1208 is disposed between the operation buttons 1202 and the earpiece 1204. In the mobile phone 1200, the physical quantity sensor 1 detecting an angular velocity and acceleration is included.

Figure 16:
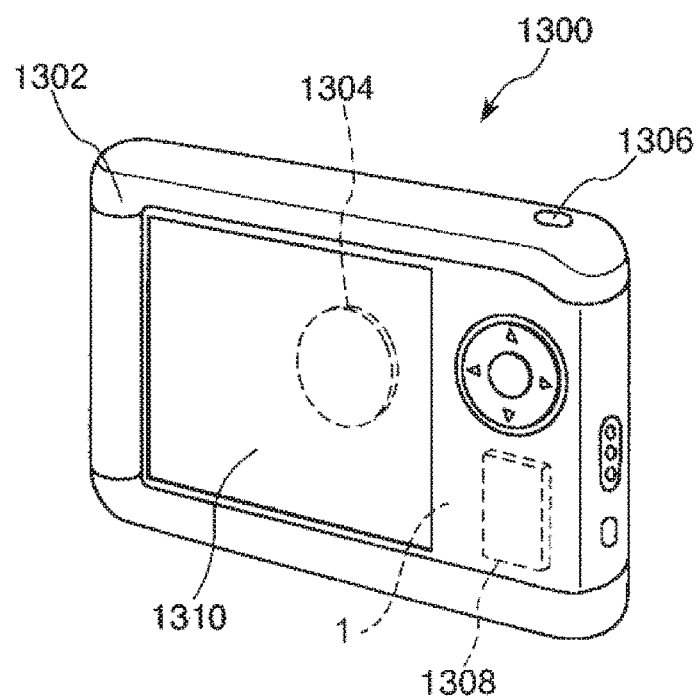
FIG. 16 is a perspective view illustrating the configuration of a digital still camera to which an electronic apparatus according to the invention is applied.

FIG. 16 is a perspective view illustrating the configuration of a digital still camera to which the electronic apparatus according to the invention is applied.

A display unit 1310 is installed on the rear surface of a case (body) 1302 of the digital still camera 1300 to perform display based on the imaging signal generated by the CCD. The display unit 1310 functions as a finder that displays a subject as an electronic image. A light-receiving unit 1304 including an optical lens (imaging optical system) or a CCD is installed on the front surface (the rear surface side of the drawing) of the case 1302. When a photographer confirms a subject image displayed on the display unit 1310 and presses a shutter button 1306, an imaging signal of the CCD at that time is transmitted and stored in a memory 1308. In the digital still camera 1300, the physical quantity sensor 1 detecting an angular velocity and acceleration is included.

Since the foregoing electronic apparatus includes the physical quantity sensor 1, high reliability can be obtained.

The electronic apparatus according to the invention can be applied not only to the personal computer (mobile personal computer) in FIG. 14, the mobile phone in FIG. 15, and the digital still camera in FIG. 16, but can also be applied to, for example, a smartphone, a tablet terminal, a timepiece, an ink jet ejection apparatus (for example, an ink jet printer), a laptop personal computer, a television, a video camera, a video tape recorder, a car navigation apparatus, a pager, an electronic organizer (also including a communication function unit), an electronic dictionary, a calculator, an electronic game apparatus, a word processor, a workstation, a television phone, a security television monitor, electronic binoculars, a POS terminal, medical apparatuses (for example, an electronic thermometer, a blood pressure meter, a blood-sugar meter, an electrocardiographic apparatus, an ultrasonic diagnostic apparatus, and an electronic endoscope), a fish finder, various measurement apparatuses, meters (for example, meters for vehicles, airplanes, and ships), and a flight simulator.

Moving Object

Next, a moving object including the physical quantity sensor 1 illustrated in FIG. 1 will be described in detail with reference to FIG. 17.

Figure 17:
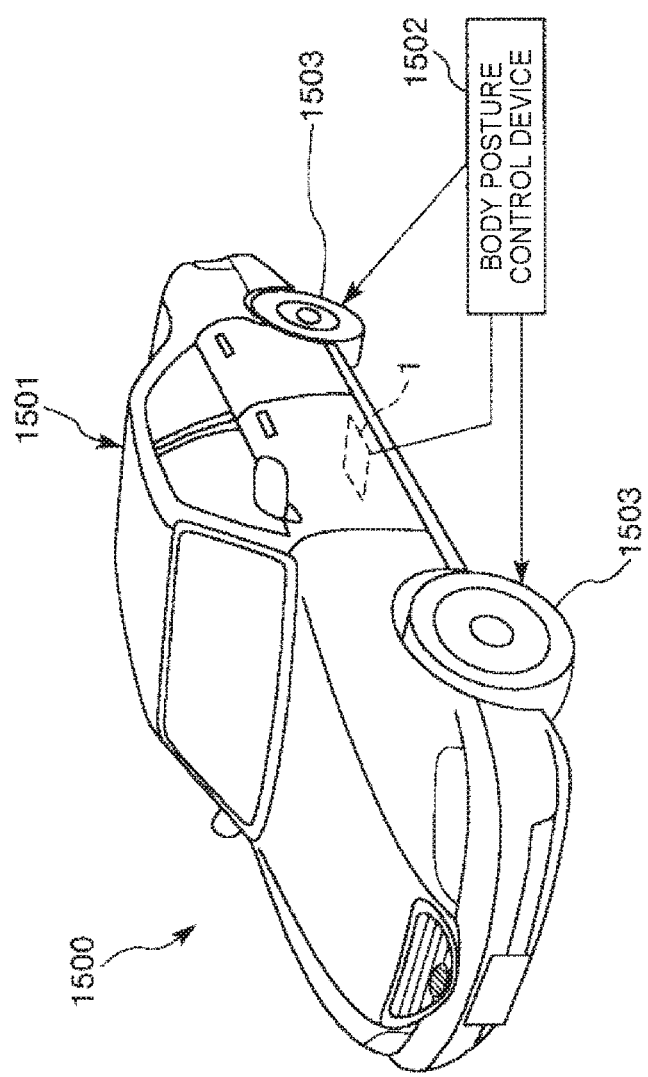
FIG. 17 is a perspective view illustrating the configuration of an automobile to which a moving object according to the invention is applied.

FIG. 17 is a perspective view illustrating the configuration of an automobile to which the moving object according to the invention is applied.

An automobile 1500 includes the physical quantity sensor 1 that detects an angular velocity and acceleration. A posture of a body 1501 can be detected by the physical quantity sensor 1. A detection signal of the physical quantity sensor 1 is supplied to a body posture control device 1502. The body posture control device 1502 can detect a posture of the body 1501 based on the signal, and can control hardness and softness of a suspension according to a detection result or control of a brake of individual wheels 1503. In addition, the posture control can be used for a bipedal walking robot or a radio controlled helicopter. As described above, posture control of various moving objects is realized by embedding the physical quantity sensor 1.

The physical quantity sensor, the electronic apparatus, and the moving object according to the invention have been described according to the embodiments, but the invention is not limited thereto. The configuration of each unit can be substituted with any configuration having the same function. Other any constituents may be added to the invention. The invention may be realized by combining any two or more of the configurations (features) in the above-described embodiments.

In the above-described embodiments, the acceleration detection element is configured to detect acceleration in the X axis direction, but the detection axis of the acceleration detection element is not particularly limited. The detection axis may be the Y axis direction or the Z axis direction. Acceleration in at least two axis directions of the X, Y, and Z axes may be detected.

The entire disclosure of Japanese Patent Application No. 2015-081499, filed Apr. 13, 2015 is expressly incorporated by reference herein.

What is claimed is:

1. A physical quantity sensor comprising:
   a package;
   an angular velocity detection element;
   an acceleration detection element;
   an integrated circuit that is electrically connected to each of the angular velocity detection element and the acceleration detection element, the integrated circuit having a first side relative to a center of the integrated circuit and an opposite second side relative to the center in a plan view;
   an acceleration detection signal wiring that connects the acceleration detection element and the integrated circuit, the acceleration detection signal wiring being connected to the first side of the integrated circuit and configured to propagate a detection signal of the acceleration detection element;
   a plurality of digital wirings to that connect the opposite second side of the integrated circuit to a terminal located on the package, the digital wirings configured to transmit digital signals including an output signal obtained by converting the detection signal of the acceleration detection element and a digital signal of a power supply for an interface of the integrated circuit; and a shield unit that is electrically connected to a fixed potential, wherein at least a part of the shield unit is disposed between the angular velocity detection element and the acceleration detection signal wiring.

2. The physical quantity sensor according to claim 1, wherein the angular velocity detection element and the acceleration detection element are offset from each other in a vertical direction in which the angular velocity detection element and the integrated circuit are overlapped such that at least a part of the shield unit is disposed between the angular velocity detection element and the acceleration detection element.

3. An electronic apparatus comprising:
a housing; and
the physical quantity sensor according to claim 2 located within the housing.

4. A moving object comprising:
a body; and
the physical quantity sensor according to claim 2 connected to the body.

5. The physical quantity sensor according to claim 1, wherein at least a part of the shield unit is disposed between the angular velocity detection element and the acceleration detection element.

6. An electronic apparatus comprising:
a housing; and
the physical quantity sensor according to claim 5 located within the housing.

7. A moving object comprising:
a body; and
the physical quantity sensor according to claim 5 connected to the body.

8. The physical quantity sensor according to claim 1, wherein at least a part of the shield unit is disposed between the acceleration detection signal wiring and at least one of a drive signal wiring through which a drive signal of the angular velocity detection element propagates and an angular velocity detection signal wiring through which the detection signal propagates.

9. The physical quantity sensor according to claim 8, wherein at least the part of the shield unit is disposed between a carrier wave wiring through which a carrier wave to be applied to the acceleration detection element propagates and at least one of the drive signal wiring and the angular velocity detection signal wiring.

10. An electronic apparatus comprising:
a housing; and
the physical quantity sensor according to claim 9 located within the housing.

11. A moving object comprising:
a body; and
the physical quantity sensor according to claim 9 connected to the body.

12. An electronic apparatus comprising:
a housing; and
the physical quantity sensor according to claim 8 located within the housing.

13. A moving object comprising:
a body; and
the physical quantity sensor according to claim 8 connected to the body.

14. The physical quantity sensor according to claim 1, wherein at least a part of the shield unit is disposed between the digital wirings and the angular velocity detection element.

15. An electronic apparatus comprising:
a housing; and
the physical quantity sensor according to claim 14 located within the housing.

16. An electronic apparatus comprising:
a housing; and
the physical quantity sensor according to claim 1 located within the housing.

17. A moving object comprising:
a body; and
the physical quantity sensor according to claim 1 connected to the body.

18. The physical quantity sensor according to claim 1, further comprising:
a base defining a concave portion,
wherein the base contains the angular velocity detection element, the acceleration detection element, the integrated circuit, the acceleration detection signal wiring, and the shield unit within the concave portion.

19. A physical quantity sensor comprising:
a package including a base having a cavity formed therein;
an angular velocity detection element suspended in the cavity;
an acceleration detection element positioned on the base in the cavity;
an integrated circuit positioned on the base in the cavity at a location that is laterally offset from and directly beneath the angular velocity detection element suspended in the cavity in a plan view of the package, the integrated circuit being electrically connected to each of the angular velocity detection element and the acceleration detection element, the integrated circuit having a first side relative to a center of the integrated circuit and proximate the acceleration detection element, and an opposite second side relative to the center and proximate a wall of the package;
an acceleration detection signal wiring that connects the acceleration detection element and the integrated circuit, the acceleration detection signal wiring being connected to the first side of the integrated circuit and configured to propagate a detection signal of the acceleration detection element;
a plurality of digital wirings that connect the opposite second side of the integrated circuit to a terminal located on the wall of the package, the digital wirings configured to transmit digital signals; and
a shield unit that is electrically connected to a fixed potential,
wherein the shield unit is disposed between the angular velocity detection element and the acceleration detection signal wiring such that, in the plan view of the package, the acceleration detection signal wiring is entirely overlapped by the shield unit.

* * * * *